(12) United States Patent
Peng et al.

(10) Patent No.: US 12,073,441 B2
(45) Date of Patent: *Aug. 27, 2024

(54) SYSTEMS AND METHODS FOR FORECASTING CAMPAIGN PARAMETERS USING MACHINE LEARNING ARCHITECTURES AND TECHNIQUES

(71) Applicant: Walmart Apollo, LLC, Bentonville, AR (US)

(72) Inventors: Yang Peng, Sunnyvale, CA (US); Qing Zou, Sunnyvale, CA (US); Sai Sri Ram Haridass, Sunnyvale, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/703,832

(22) Filed: Mar. 24, 2022

(65) Prior Publication Data
US 2022/0245679 A1 Aug. 4, 2022

Related U.S. Application Data

(63) Continuation of application No. 17/163,392, filed on Jan. 30, 2021, now Pat. No. 11,295,347.

(51) Int. Cl.
*G06Q 30/02* (2023.01)
*G06N 7/01* (2023.01)
(Continued)

(52) U.S. Cl.
CPC ........... *G06Q 30/0276* (2013.01); *G06N 7/01* (2023.01); *G06N 20/00* (2019.01); *G06Q 10/04* (2013.01);
(Continued)

(58) Field of Classification Search
CPC ............... G06Q 30/02; G06Q 30/0276; G06Q 30/0201; G06Q 10/04; G06Q 30/0247;
(Continued)

(56) References Cited

U.S. PATENT DOCUMENTS 8,706,548 B1   4/2014   Blume et al.
10,496,927 B2 * 12/2019   Achin ..................... G06N 20/10
(Continued)

FOREIGN PATENT DOCUMENTS

CN     107871244 A  *  4/2018   ............. G06Q 30/02
JP     2013-502018 A *  1/2013   ............. G06F 13/00
(Continued)

OTHER PUBLICATIONS

Ren, Kan; Chang, Ke; Rong. Yifei Yu, Yong; Wang, Jun, Bidding machine: Learning to Bid for Directly Optimizing Profits in Displey Advertising (English), IEEE Transaction on Knowledge and Data Engineering, vol. 30, Issue: 4, pp. 645-659, Feb. 28, 2018 (Year: 2018).*

(Continued)

*Primary Examiner* — Marilyn G Macasiano
(74) *Attorney, Agent, or Firm* — BRYAN CAVE LEIGHTON PAISNER LLP (57) ABSTRACT

A system comprising one or more processors and one or more non-transitory computer-readable media storing computing instructions that cause the one or more processors to perform: training a machine learning model using one or more training features, wherein each training feature of the one or more training features is segmented in a respective group of one or more groups by a respective time period; executing, after training the machine learning model, the machine learning model to generate a forecasting system to predict at least a predicted return on an ad spend (ROAS) value; and providing access to the forecasting system to (Continued)

predict one or more input parameters for an electronic advertising campaign to forecast one or more campaign predictions associated with the electronic advertising campaign. Other embodiments are disclosed herein.

20 Claims, 6 Drawing Sheets

(51) Int. Cl.
    *G06N 20/00*     (2019.01)
    *G06Q 10/04*     (2023.01)
    *G06Q 30/0201*     (2023.01)
    *G06Q 30/0241*     (2023.01)
    *G06Q 30/0251*     (2023.01)

(52) U.S. Cl.
    CPC ..... *G06Q 30/0201* (2013.01); *G06Q 30/0247* (2013.01); *G06Q 30/0249* (2013.01); *G06Q 30/0256* (2013.01)

(58) Field of Classification Search
    CPC ........... G06Q 30/0249; G06Q 30/0256; G06Q 30/0254; G06Q 10/067; G06Q 30/0246; G06Q 30/0207; G06N 7/005; G06N 20/00
    See application file for complete search history.

(56) References Cited

U.S. PATENT DOCUMENTS

| | | | |
|---|---|---|---|
| 10,614,480 B2 | 4/2020 | Genc-Kaya et al. | |
| 11,037,348 B2 * | 6/2021 | Shi | G06T 7/60 |
| 11,107,109 B2 * | 8/2021 | Qi | G06Q 30/0202 |
| 2007/0124767 A1 * | 5/2007 | Laskowski-Bender | G06Q 30/02 725/42 |
| 2007/0130004 A1 | 6/2007 | Borgs et al. | |
| 2011/0276392 A1 | 11/2011 | Vaver et al. | |
| 2012/0004975 A1 * | 1/2012 | Satyavolu | G06Q 30/02 705/14.1 |
| 2012/0158456 A1 * | 6/2012 | Wang | G06Q 30/0241 705/7.31 |
| 2014/0081696 A1 * | 3/2014 | Salomatin | G06Q 10/1095 705/7.19 |
| 2016/0379244 A1 * | 12/2016 | Kalish | G06Q 30/0242 705/14.41 |
| 2017/0300939 A1 * | 10/2017 | Chittilappilly | G06Q 30/0207 |
| 2018/0330258 A1 * | 11/2018 | Harris | G06N 7/01 |
| 2019/0034976 A1 | 1/2019 | Hamedi et al. | |
| 2019/0080347 A1 * | 3/2019 | Smith | G06Q 30/0269 |
| 2020/0258120 A1 * | 8/2020 | Ardulov | G06F 18/251 |

FOREIGN PATENT DOCUMENTS

| | | | |
|---|---|---|---|
| JP | 2013502018 | 1/2013 | |
| JP | 5662446 | 1/2015 | |
| JP | 5662446 B2 * | 1/2015 | ............. G06F 13/00 |
| JP | 2015-97097 A * | 5/2015 | ............. G06Q 30/02 |
| WO | WO 2017/095942 A1 * | 6/2017 | ............. G06Q 30/02 |
| WO | WO 2020/167371 A1 * | 8/2020 | ............. G06Q 30/02 |

OTHER PUBLICATIONS

Richard E. Chatwin, An overview of computational challenges in online advertising (English), 2013 American Control Conference (pp. 5990-6007, Oct. 18, 2013 (Year: 2013).*
Gharibshah, Zhabiz; Zhu, Xingquan, User Response Predcition in Online Advertising(English), Jan. 6, 2021 (Year: 2021).*
Xianshan Qu; Li Li; Xi Liu; Rui Chen; Yong Ge; Soo-Hyun Choi, A Dynamic Neural Network Model for Click-Through Rate Prediction in Real-Time Bidding(English), 2019 IEEE International Conference on Big Data (Big Data) (pp. 1887-1896), Mar 27, 2020 (Year: 2020).*
Wang, Jun; Zhang, Weinan; Yuan, Shuai, Dsiplay Advertising with Real-Time Bidding (RTB) and Behavioural Targeting (Englsih), Oct. 7, 2016 (Year: 2016).*
A. Gajewar, L. Wu; R. Yemeni, Forecasting Squatting of demand in display advertising (English), 2016 IEEE International Conference on Big Data (Big Data) (pp. 1587-1594), Dec. 1, 2016 (Year: 2016) Dec. 1, 2016.
Ying Grace Cui and Ruofei (Bruce) Zhang, Method and System for Campaign Performance Forecasting in Non-Guaranteed Delivery (NGD) of Display Advertising (English) (United States)), The IP.com Prior Art Database, Oct. 18, 2012 (Year: 2012) Oct. 18, 2012.

* cited by examiner

- 401 – Storage Module(s)
  - 320 – Web Server
  - 330 – Electronic Platform
    - 410 – Database(s)
      - 360 – Items
      - 370 – Electronic Advertising Campaigns
      - 380 – Historical Campaign Data
    - 310 – Forecasting System
      - 350 – Machine Learning Model
        - 420 – Training Features
          - 425
            - 421 – Ad Spend Data
            - 422 – Revenue Data
            - 423 – Time Periods
            - 424 – Weights
        - 440 – Training Procedure
        - 450 – Log Linear Regression Model
        - 470 – Inputs
          - 471
          - 472
        - 355 – Campaign Predictions
          - 461 – Predicted ROAS Values
          - 462 – Predicted Budget Values

- 402 – Processing Module(s)

610– Providing access to forecasting system that includes a machine learning model configured to forecast one or more campaign predictions associated with an electronic advertising campaign 620– Extracting historical campaign data from one or more databases, at least in part, using a distributed processing system 630– Generating training features for training the machine learning model, the training features at least including ad spend values extracted from the historical campaign data for each of a plurality of time periods, revenue values extracted from the historical campaign data for each of a plurality of time periods, and weights associated with each of the plurality of time periods 640– Executing a training procedure that is configured to train the machine learning model, at least in part, using the training features 650– Executing, after completion of the training procedure, the machine learning model to forecast a predicted ROAS value or a predicted budget value

FIG. 6

SYSTEMS AND METHODS FOR FORECASTING CAMPAIGN PARAMETERS USING MACHINE LEARNING ARCHITECTURES AND TECHNIQUES

CROSS-REFERENCE TO RELATED APPLICATIONS

This application is a continuation of U.S. application Ser. No. 17/163,392, filed Jan. 30, 2021, to be issued as U.S. Pat. No. 11,295,347. U.S. application Ser. No. 17/163,392 is incorporated herein by reference in its entirety.

TECHNICAL FIELD

This disclosure relates generally to forecasting or predicting campaign parameters using machine learning architectures and techniques.

BACKGROUND

Electronic platforms enable users to browse, view, purchase, and/or order items corresponding to various products and services. In many cases, the entities (e.g., companies or individuals) offering the products and/or services through the electronic platforms may initiate electronic advertising campaigns to promote their products and/or services to the customers. However, launching electronic advertising campaigns can be costly and, in many cases, the entities launching the electronic advertising campaigns have no way of predicting the success of the electronic advertising campaigns.

While it may be desirable for the electronic platforms to predict parameters for electronic advertising campaigns, doing so can be technically challenging in several respects. One technical problem relates to implementing a prediction feature that accurately predicts the parameters for electronic advertising campaigns with high precision. Furthermore, in scenarios in which an electronic platform simultaneously processes large number of requests, another technical problem relates to providing a processing framework that quickly and efficiently processes all of the prediction requests in a timely manner. In some cases, this may be technically challenging because generating the predictions may involve gathering and analyzing large amounts of relevant data for electronic advertising campaigns. Other technical problems associated with predicting parameters for electronic advertising campaigns are described in further detail below.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and perform functions comprising: providing access to a forecasting system that includes a machine learning model configured to forecast one or more campaign predictions associated with an electronic advertising campaign, the one or more campaign predictions at least including a predicted return on ad spend (ROAS) value or a predicted budget value; extracting historical campaign data from one or more databases, at least in part, using a distributed processing system; generating training features for training the machine learning model, the training features at least including ad spend values extracted from the historical campaign data for each of a plurality of time periods, revenue values extracted from the historical campaign data for each of the plurality of time periods, and weights associated with each of the plurality of time periods; executing a training procedure that is configured to train the machine learning model, at least in part, using the training features; and executing, after completion of the training procedure, the machine learning model to forecast the predicted ROAS value or the predicted budget value.

Various embodiments include a method. The method can be implemented via execution of computing instructions configured to run at one or more processors and configured to be stored at non-transitory computer-readable media The method can comprise: providing access to a forecasting system that includes a machine learning model configured to forecast one or more campaign predictions associated with an electronic advertising campaign, the one or more campaign predictions at least including a predicted return on ad spend (ROAS) value or a predicted budget value; extracting historical campaign data from one or more databases, at least in part, using a distributed processing system; generating training features for training the machine learning model, the training features at least including ad spend values extracted from the historical campaign data for each of a plurality of time periods, revenue values extracted from the historical campaign data for each of the plurality of time periods, and weights associated with each of the plurality of time periods; executing a training procedure that is configured to train the machine learning model, at least in part, using the training features; and executing, after completion of the training procedure, the machine learning model to forecast the predicted ROAS value or the predicted budget value.

Several embodiments include a system comprising one or more processors and one or more non-transitory computer-readable media storing computing instructions that, when executed on the one or more processors, cause the one or more processors to perform certain acts. The acts can include training a machine learning model using one or more training features. Each training feature of the one or more training features is segmented in a respective group of one or more groups by a respective time period of a plurality of time periods. The acts further can include executing, after training the machine learning model, the machine learning model to generate a forecasting system to predict at least a predicted return on an ad spend (ROAS) value. The acts also can include providing access to the forecasting system to predict one or more input parameters for an electronic advertising campaign to forecast one or more campaign predictions associated with the electronic advertising campaign.

A number of embodiments include a method being implemented via execution of computing instructions configured to run at one or more processors and stored at one or more non-transitory computer-readable media. The method can include training a machine learning model using one or more training features. Each training feature of the one or more training features is segmented in a respective group of one or more groups by a respective time period of a plurality of time periods. The method also can include executing, after training the machine learning model, the machine learning model to generate a forecasting system to predict at least a return on a predicted ad spend (ROAS) value. The method further can include providing access to the forecasting system to predict one or more input parameters for an electronic advertising campaign to forecast one or more campaign predictions associated with the electronic advertising campaign.

Figure 1:
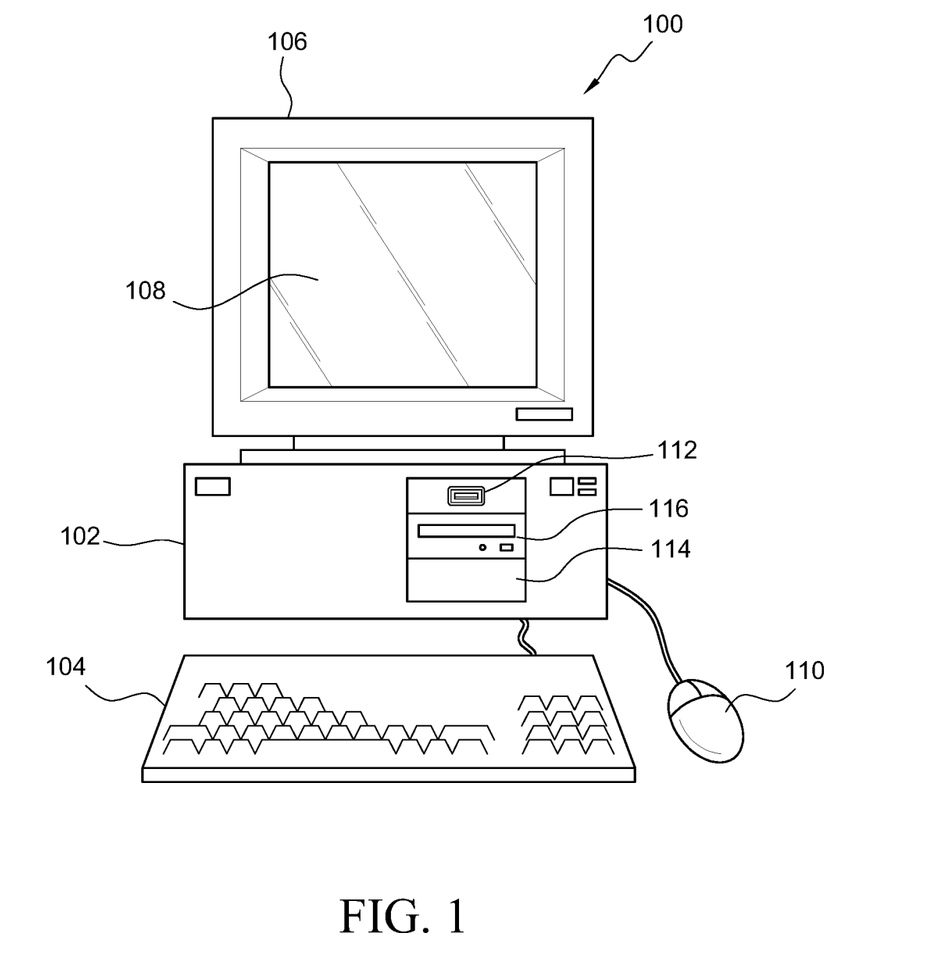
FIG. 1 illustrates a front elevational view of a computer system that is suitable for implementing various embodiments of the systems disclosed in FIGS. 3, 4, and 5.
Figure 2:
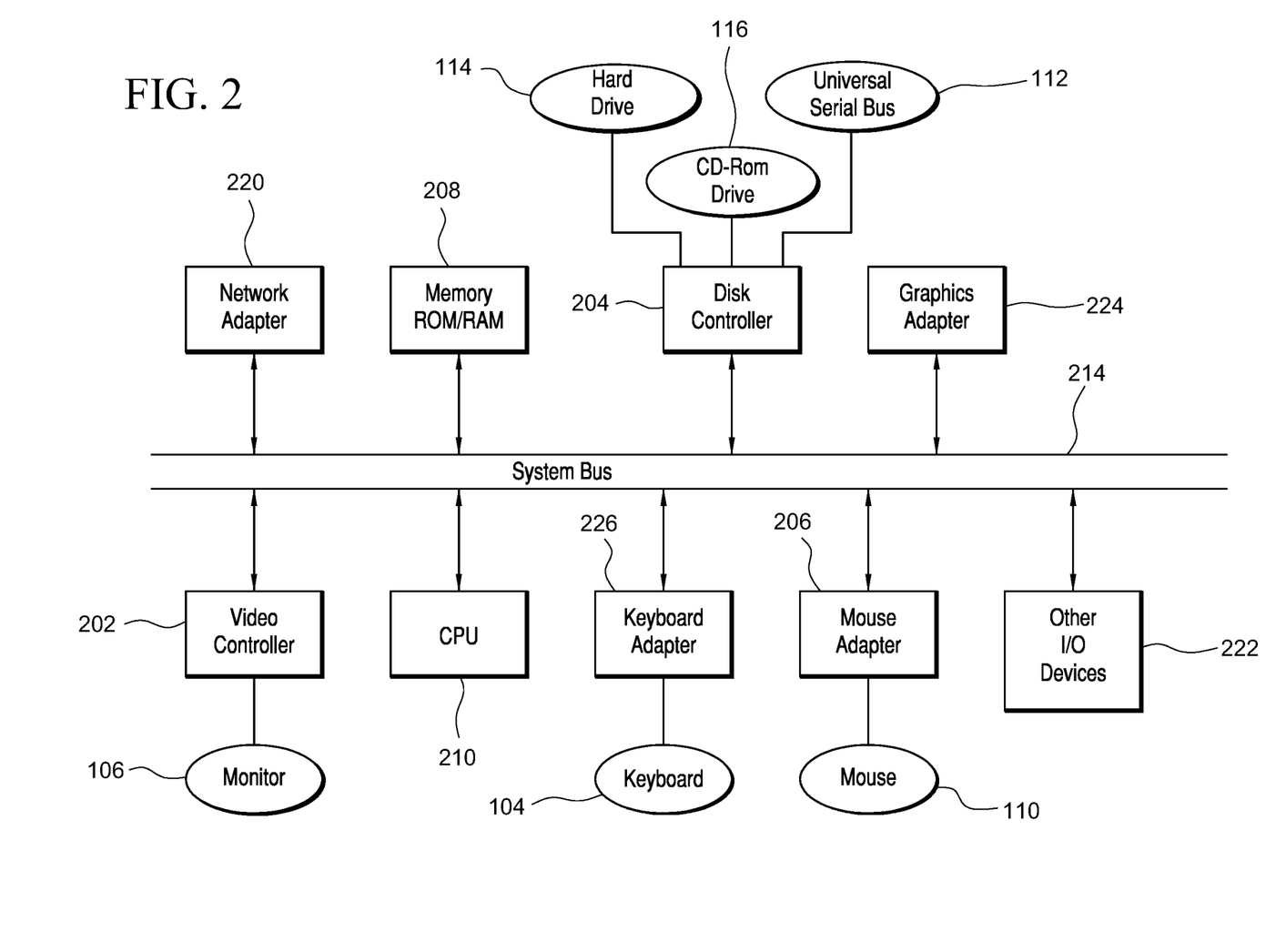
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
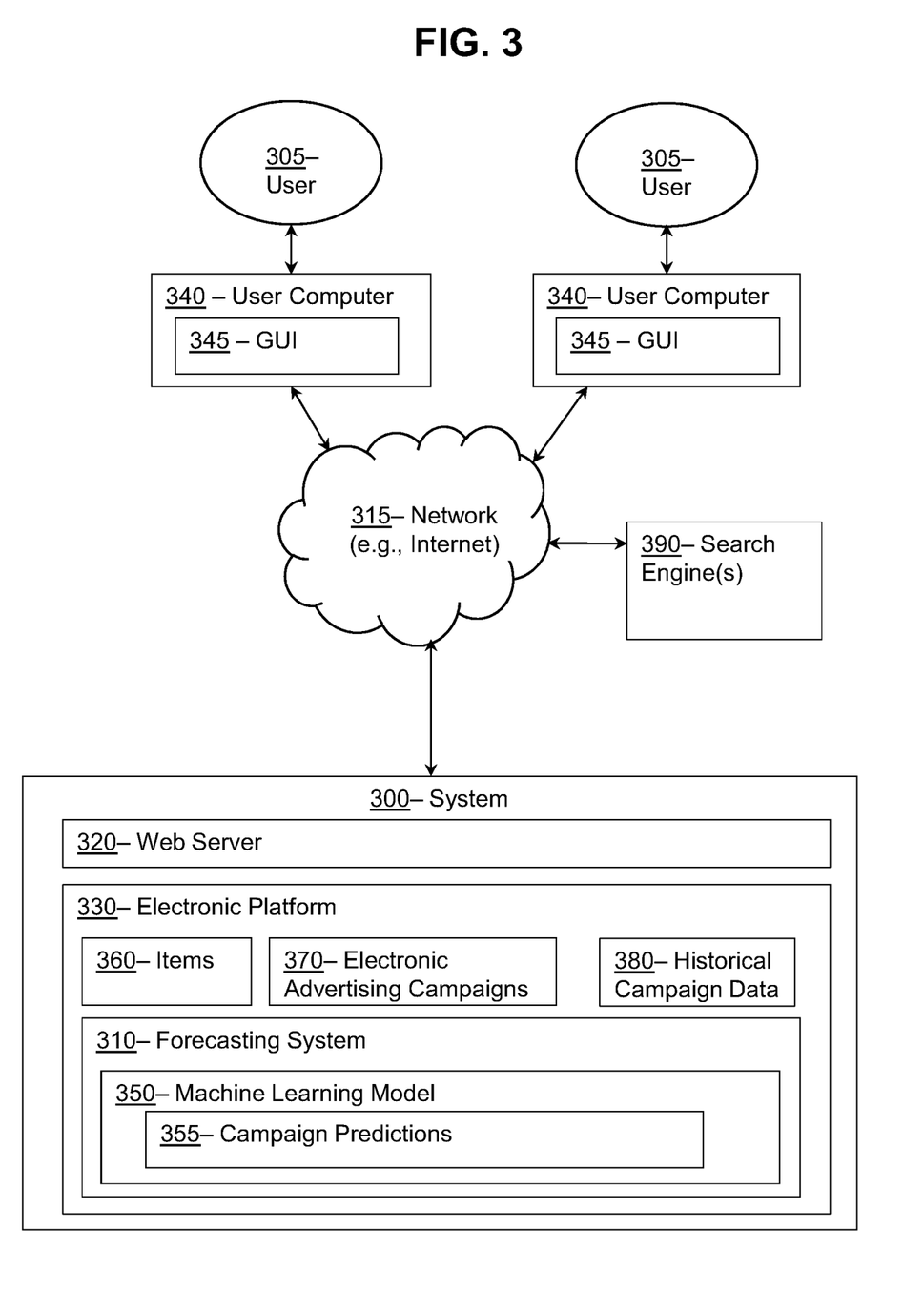
FIG. 3 illustrates a representative block diagram of a system according to certain embodiments.

Turning ahead in the drawings, FIG. 3 illustrates a block diagram of a system 300 that can be employed for forecasting advertisement campaign parameters, as described in greater detail below. System 300 is merely exemplary and embodiments of the system are not limited to the embodiments presented herein. System 300 can be employed in many different embodiments or examples not specifically depicted or described herein. In some embodiments, certain elements or modules of system 300 can perform various procedures, processes, and/or activities. In these or other embodiments, the procedures, processes, and/or activities can be performed by other suitable elements or modules of system 300.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In some embodiments, system 300 can include a forecasting system 310, a web server 320, and an electronic platform 330. The forecasting system 310, web server 320, and/or electronic platform 330 can each be a computer system, such as computer system 100 (FIG. 1), as described above, and can each be a single computer, a single server, or a cluster or collection of computers or servers, or a cloud of computers or servers. In another embodiment, a single computer system can host each of two or more of the forecasting system 310, web server 320, and/or electronic platform 330. Additional details regarding the forecasting system 310, web server 320, and/or electronic platform 330 are described herein.

In many embodiments, system 300 also can comprise user computers 340. User computers 340 can comprise any of the elements described in relation to computer system 100. In some embodiments, user computers 340 can be mobile devices. A mobile electronic device can refer to a portable electronic device (e.g., an electronic device easily conveyable by hand by a person of average size) with the capability to present audio and/or visual data (e.g., text, images, videos, music, etc.). For example, a mobile electronic device can comprise at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile electronic device can comprise a volume and/or weight sufficiently small as to permit the mobile electronic device to be easily conveyable by hand. For examples, in some embodiments, a mobile electronic device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile electronic device can weigh less than or equal to 15.6 Newtons, 17.8 Newtons, 22.3 Newtons, 31.2 Newtons, and/or 44.5 Newtons.

Exemplary mobile electronic devices can comprise (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile electronic device can comprise an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Palm® operating system by Palm, Inc. of Sunnyvale, California, United States, (iv) the Android™ operating system developed by the Open Handset Alliance, (v) the Windows Mobile™ operating system by Microsoft Corp. of Redmond, Washington, United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In many embodiments, system 300 can comprise graphical user interfaces ("GUIs") 345. In the same or different embodiments, GUIs 345 can be part of and/or displayed by computing devices associated with system 300 and/or user computers 340, which also can be part of system 300. In some embodiments, GUIs 345 can comprise text and/or graphics (images) based user interfaces. In the same or different embodiments, GUIs 345 can comprise a heads up display ("HUD"). When GUIs 345 comprise a HUD, GUIs 345 can be projected onto glass or plastic, displayed in midair as a hologram, or displayed on monitor 106 (FIG. 1). In various embodiments, GUIs 345 can be color or black and white. In many embodiments, GUIs 345 can comprise an application running on a computer system, such as computer system 100, user computers 340, and/or system 300. In the same or different embodiments, GUIs 345 can comprise a website accessed through network 315 (e.g., the Internet). In some embodiments, GUIs 345 can comprise an eCommerce website. In the same or different embodiments, GUIs 345 can be displayed as or on a virtual reality (VR) and/or augmented reality (AR) system or display.

In some embodiments, web server 320 can be in data communication through network 315 (e.g., the Internet) with user computers (e.g., 340). In certain embodiments, the network 315 may represent any type of communication network, e.g., such as one that comprises the Internet, a local area network (e.g., a Wi-Fi network), a personal area network (e.g., a Bluetooth network), a wide area network, an intranet, a cellular network, a television network, and/or other types of networks. In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, the forecasting system 310, web server 320, and/or electronic platform 330 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of the forecasting system 310, web server 320, and/or electronic platform 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of the forecasting system 310, web server 320, and/or electronic platform 330. In a similar manner, the processing module(s) and the memory storage module(s) can be local and/or remote to each other.

In many embodiments, the forecasting system 310, web server 320, and/or electronic platform 330 can be configured to communicate with one or more user computers 340. In some embodiments, user computers 340 also can be referred to as customer computers. In some embodiments, the forecasting system 310, web server 320, and/or electronic platform 330 can communicate or interface (e.g., interact) with one or more customer computers (such as user computers 340) through a network 315 (e.g., the Internet). Network 315 can be an intranet that is not open to the public. Accordingly, in many embodiments, the forecasting system 310, web server 320, and/or electronic platform 330 (and/or the software used by such systems) can refer to a back end of system 300 operated by an operator and/or administrator of system 300, and user computers 340 (and/or the software used by such systems) can refer to a front end of system 300 used by one or more users 305, respectively. In some embodiments, users 305 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Meanwhile, in many embodiments, the forecasting system 310, web server 320, and/or electronic platform 330 also can be configured to communicate with one or more databases. The one or more databases can comprise a product database that contains information about products, items, or SKUs (stock keeping units) sold by a retailer. The one or more databases can be stored on one or more memory storage modules (e.g., non-transitory memory storage module(s)), which can be similar or identical to the one or more memory storage module(s) (e.g., non-transitory memory storage module(s)) described above with respect to computer system 100 (FIG. 1). Also, in some embodiments, for any particular database of the one or more databases, that particular database can be stored on a single memory storage module of the memory storage module(s), and/or the non-transitory memory storage module(s) storing the one or more databases or the contents of that particular database can be spread across multiple ones of the memory storage module(s) and/or non-transitory memory storage module(s) storing the one or more databases, depending on the size of the particular database and/or the storage capacity of the memory storage module(s) and/or non-transitory memory storage module(s).

The one or more databases can each comprise a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, IBM DB2 Database, and/or NoSQL Database.

Meanwhile, communication between the forecasting system 310, web server 320, and/or electronic platform 330, and/or the one or more databases can be implemented using any suitable manner of wired and/or wireless communication. Accordingly, system 300 can comprise any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can comprise Bluetooth, Zigbee, Wireless Universal Serial Bus (USB), Z-Wave, etc.; exemplary LAN and/or WAN protocol(s) can comprise Institute of Electrical and Electronic Engineers (IEEE) 802.3 (also known as Ethernet), IEEE 802.11 (also known as WiFi), etc.; and exemplary wireless cellular network protocol(s) can comprise Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can comprise wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can comprise wireless communication hardware including, for example, one or more radio transceivers, one or more infrared transceivers, etc. Additional exemplary communication hardware can comprise one or more networking components (e.g., modulator-demodulator components, gateway components, etc.).

The electronic platform 330 can provide access to various types of users 305. One subset of users 305 may include customers. Another subset of users 305 may include vendors. The electronic platform 330 may facilitate access for other types of users 305 as well (e.g., administrators and/or platform providers). Electronic accounts provided by the electronic platform 330 enable various functions to be performed by each of the user types (e.g., customers, vendors, and administrators). The types of functions capable of being performed may vary based on the user types.

In certain embodiments, users 305 corresponding to customers may operate user computers 340 to browse, view, purchase, and/or order items 360 via the electronic platform 330. For example, the electronic platform 330 may include an eCommerce website that enables users 305 to add items 360 to a digital shopping cart and to purchase the added items 360. The items 360 made available via the electronic platform 330 may generally relate to any type of product and/or service including, but not limited to, products and/or services associated with entertainment, furniture, apparel, kitchenware, fashion, appliances, sporting goods, etc.

In certain embodiments, users 305 corresponding to vendors may include entities (e.g., such as individuals, companies, manufacturers, wholesalers, and/or businesses) who list, offer, advertise, and/or sell items 360 on the electronic platform 330. In certain embodiments, the accounts associated with vendors may enable the vendors to add, edit, and/or remove items 360 listed on the electronic platform 330. Additionally, the accounts associated with vendors may enable the vendors to create, update, delete, manage, and/or otherwise control electronic advertising campaigns 370 associated with one or more of the items 360. For example, the electronic platform 330 may provide an advertising portal which is accessible to vendors, and the portal may enable the vendors to create electronic advertising campaigns 370 on one or more search engines 390. Exemplary search engines 390 may include Google, Bing, Yahoo, Baidu, etc.

Each electronic advertising campaign 370 may enable a vendor to advertise one or more items 360 listed on the electronic platform 330. The portal provided by the electronic platform 330 may permit the vendor to specify various parameters associated with the electronic advertising campaign 370. For example, the electronic platform 330 may enable the vendor to specify a budget for the electronic advertising campaign 370, an advertising channel (e.g., indicating the types of product and/or service categories that apply to each item 360 associated with the electronic advertising campaign 370), and/or keywords (e.g., keywords associated with the item 360 or items 360 that are associated with the electronic advertising campaign 370). Other types of parameters may also be specified to define and/or update the electronic advertising campaigns 370 created via the electronic platform 330.

The electronic platform 330 can be configured to store historical campaign data 380 which records any or all activities involving electronic advertising campaigns 370 associated with items 360 offered on the electronic platform 330. In certain embodiments, the historical campaign data 380 may include any or all data associated with previous and/or ongoing electronic advertising campaigns 370. For example, the historical campaign data 380 stored for each electronic advertising campaign 370 may indicate, inter alia, the advertising expenditure or budget that was allocated to the electronic advertising campaign 370, the revenue generated by the electronic advertising campaign 370, and the time of year when the electronic advertising campaign 370 occurred or is occurring. The historical campaign data 380 may further indicate the return on advertising spend (ROAS) associated with each electronic advertising campaign 370, and/or the ROAS may derived based on the advertising expenditures and revenues generated during the electronic advertising campaign 370. The historical campaign data 380 may further indicate the particular item(s) 360 that was the subject of the electronic advertising campaign 370, the advertising channel(s) selected for the electronic advertising campaign 370, the keywords selected for the electronic advertising campaign 370, the search engine 390 that was utilized for the electronic advertising campaign 370, and/or any data that was specified by the vendor to define the advertising campaign 370. Any other data associated with the advertising campaigns 370 may also be stored in the historical campaign data 380.

The forecasting system 310 can be configured to generate various campaign predictions 355 to assist a vendor with creating a new electronic advertising campaign 370 and/or updating an existing electronic advertising campaign 370. In certain embodiments, in response to a vendor accessing an advertising portal on the electronic platform 330, a user computer 340 operated by the vendor may present one or more GUIs 345 associated with the forecasting system 310. The one or more GUIs 345 may enable the vendor to input various criteria that is used to generate the campaign predictions 355. The campaign predictions 355 may then be displayed to the vendor on one or more GUIs 345.

As explained in further detail below, the campaign predictions 355 can include predicted ROAS values and/or predicted budget values in certain embodiments. A predicted ROAS value may correspond to a forecasted or estimated ROAS for an electronic advertising campaign 370 that is determined based, at least in part, on a desired advertisement budget specified by the vendor via the one or more GUIs 345. A predicted budget value may correspond to a forecasted budget or ad expenditure for an electronic advertising campaign 370 that is determined based, at least in part, on a desired ROAS specified by the vendor via the one or more GUIs 345. The forecasting system may generate other types of campaign predictions 355 as well.

The forecasting system 310 may include a machine learning model 350 that is configured to generate some or all of the campaign predictions 355. The configuration of the machine learning model 350 can vary. The machine learning model 350 can include one or more machine learning networks and/or artificial neural networks that are configured to execute deep learning functions, artificial intelligence (AI) functions, and/or machine learning functions to perform the functions described herein, including functions related to generating the campaign predictions 355. In certain embodiments, the machine learning model 350 can be trained to perform these and other machine learning functions using any supervised, semi-supervised, and/or unsupervised training procedure. Exemplary configurations and training procedures for the machine learning model 350 are described below.

In certain embodiments, the machine learning model 350 can be trained, at least in part, using the historical campaign data 380 to accurately predict or forecast the campaign predictions 355 with high precision. The machine learning model 350 also can be trained using weight values that account for seasonal trends and/or recent sales trends. As explained in further detail below, the machine learning model 350 may utilize a log linear regression model to accurately forecast or generate the campaign predictions 355. Other types of learning models also may be utilized to generate the campaign predictions 355.

Figure 4:
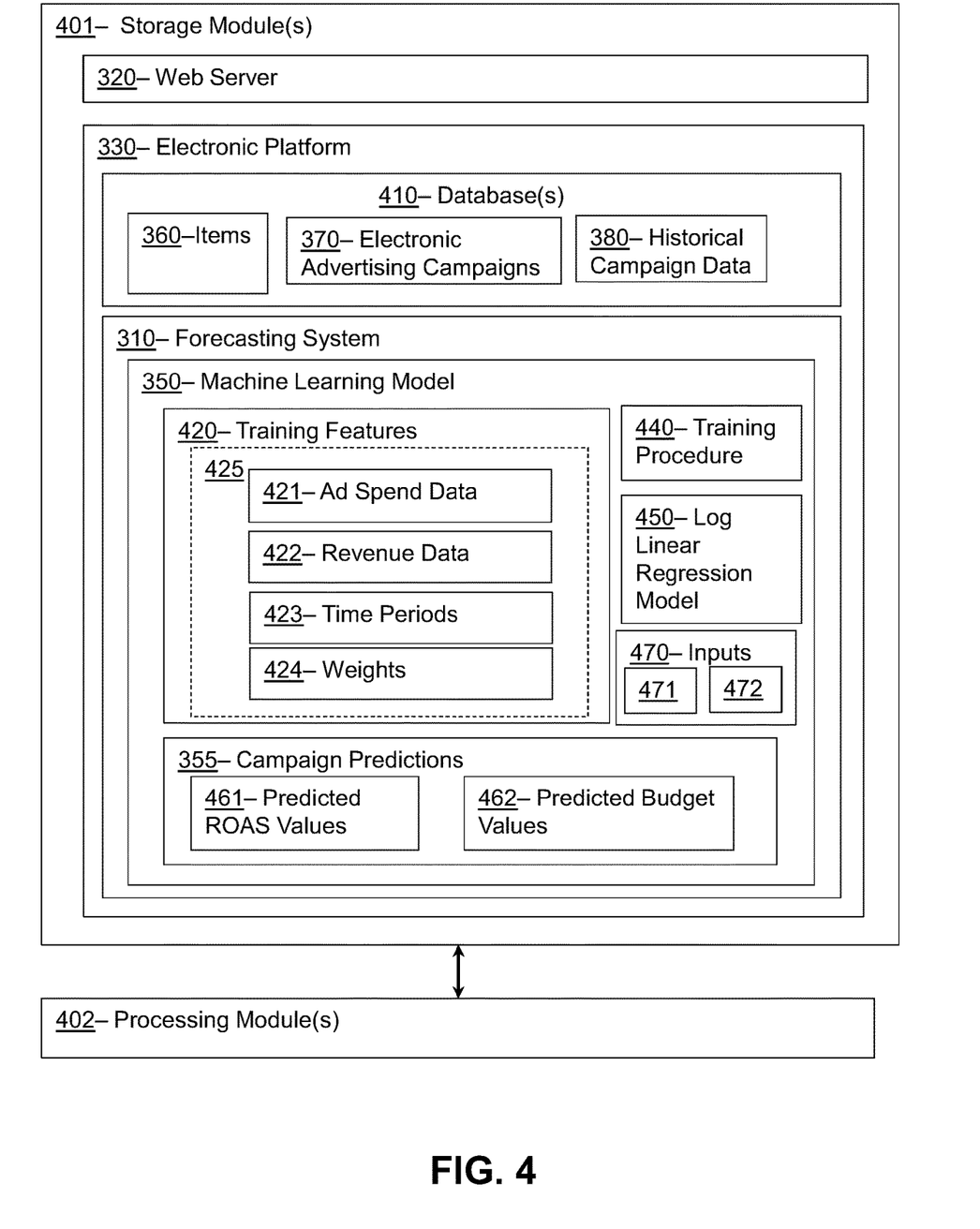
FIG. 4 illustrates a representative block diagram of a portion of the system of FIG. 3 according to certain embodiments.

FIG. 4 is a block diagram illustrating a detailed view of an exemplary system 300 in accordance with certain embodiments. The system 300 includes one or more storage modules 401 that are in communication with one or more processing modules 402. The one or more storage modules 401 can include: (i) non-volatile memory, such as, for example, read-only memory (ROM) or programmable read-only memory (PROM); and/or (ii) volatile memory, such as, for example, random access memory (RAM), dynamic RAM (DRAM), static RAM (SRAM), etc. In these or other embodiments, storage modules 401 can comprise (i) non-transitory memory and/or (ii) transitory memory. The one or more processing modules 402 can include one or more central processing units (CPUs), graphical processing units (GPUs), controllers, microprocessors, digital signal processors, and/or computational circuits. The one or more storage modules 401 can store data and instructions associated with providing a forecasting system 310, web server 320, and electronic platform 330. The one or more processing modules 402 can be configured to execute any and all instructions associated with implementing the functions performed by these components. Exemplary configurations for each of these components are described in further detail below.

The exemplary electronic platform 330 of system 300 includes one or more databases 410. The one or more databases 410 store data and information related to items 360 (e.g., products and/or services) that are offered or made available via the electronic platform 330. For example, for each item 360, the data and information may include any or all of the following: an item name or title, an item category associated with the item, one or more customer ratings for the item, an item description, a sale price, images corresponding to the item, a number of total sales, and various other data associated with the item. The one or more databases 410 also may store the historical campaign data 380 which, as mentioned above, may include any data associated with previous and/or ongoing electronic advertising campaigns 370.

The web server 320 can be configured to receive and process any requests received by users 305 including, but not limited to, requests to view web pages provided by the electronic platform 330. For example, the web server 320 can receive and process requests from customers to view, access, and/or purchase items 360 offered on the electronic platform 330. Similarly, the web server 320 can receive and process requests from vendors to add, edit, and/or delete items 360 offered on the electronic platform 330, and to add, edit, delete, manage, and/or control electronic advertising campaigns 370.

As mentioned above, the forecasting system 310 may include a machine learning model 350 that generates campaign predictions 355 corresponding to electronic advertising campaigns 370. For example, campaign predictions 355 generated by the machine learning model 350 may include can include predicted ROAS values 461 (e.g., each of which indicates a forecasted or projected ROAS for a particular electronic advertising campaign 370) and predicted budget values 462 (e.g., each of which indicates a forecasted budget for a particular electronic advertising campaign 370).

In certain embodiments, the forecasting system 310 may present a user 305 with a GUI 345 (FIG. 3) that permits the user 305 to specify an input 470 either a desired budget 472 or a desired ROAS 471 for an electronic advertising campaign being created or updated. If the user 305 inputs a desired budget 472 for the electronic advertising campaign 370, the forecasting system 310 will execute the machine learning model 350 to generate a predicted ROAS value 461 based on the desired budget input by the user 305. Conversely, if the user 305 inputs a desired ROAS 471 for an electronic advertising campaign 370, the forecasting system 310 will execute the machine learning model 350 to forecast a predicted budget value 462 based on the desired ROAS input by the user 305.

In certain embodiments, each time a user 305 submits a request for a campaign prediction 355 (e.g., for a predicted ROAS value 461 or a predicted budget value 462), the forecasting system 310 and/or machine learning model 350 executes a training procedure 440 to train the machine learning model 350 for generating the campaign prediction 355 associated with the request. The training procedure 440 may gather training features 420 specifically tailored or customized for training the machine learning model 350 for each particular request. For example, the training features 420 utilized to train the machine learning model 350 for a specific request may include parameters (e.g., such as historical ad spend data 421, revenue data 422, etc.) extracted from the historical campaign data 380 that are related or similar electronic advertising campaigns 370 that is stored in the historical campaign data 380. By selectively tailoring the training features 420 and re-executing the training procedure 440 for each request, the machine learning model 350 is able to produce highly accurate predictions while accounting for the most recent information stored in the historical campaign data 380.

In certain embodiments, in response to receiving a forecasting request for a current or future electronic advertising campaign 370, the training procedure 440 analyzes the historical campaign data 380 and extracts the training features 420 from previous or ongoing electronic advertising campaigns 370 that relate to the same type of item 360 or that are included in the same category of items 360. The training features 420 extracted from each of these previous electronic advertising campaigns can include historical ad spend data 421, revenue data 422, and time periods 423.

The ad spend data 421 may indicate the amount of money or cost a vendor spent during a particular time period 423 on the electronic advertising campaign 370. The revenue data 422 may indicate the amount of revenue the vendor received during the particular time period 423 based on the electronic advertising campaign 370. The time periods 423 may indicate a timeframe identifying when the electronic advertising campaign 370 was conducted, or a portion of a timeframe identifying the when the electronic advertising campaign 370 was conducted.

To illustrate by way of example, if a previous advertising campaign was conducted over the course of eight weeks, the time period 423 may correspond to a particular week and the ad spend data 421 and revenue data 422 associated with that week may be associated with a separate or distinct group of training features 420 (e.g., a group of training features represented by the variables week_num, adspend, and revenue). The remaining seven weeks of the advertising campaign may likewise be segmented into separate groups of training features 420, such that each group includes an identifier for the time period 423 (i.e., identifying the particular week of the campaign), the ad spend data 421 indicating the adverting costs expended for that time period 423, and the revenue data 422 generated during that time period 423. Each group of training features 420 may then be utilized as a separate input to train the machine learning model 350.

It should be noted that while certain examples of the time period 423 are discussed in this disclosure as pertaining to a particular week of the year, the time period 423 may generally represent any timeframe (e.g., a day, week, month, year, etc.).

In addition to extracting the historical ad spend data 421, revenue data 422, and time periods 423 from the historical campaign data 380, the training procedure 440 may additionally determine or generate weights 424 for inclusion in the training features 420. Each weight 424 may be associated with a corresponding time period 423 or group of training features 420 (e.g., such as represented by the variables week_num, adspend, revenue, and weight). The weights 424 generated by the training procedure 440 can be helpful to train the machine learning model 350 to accurately forecast the predicted ROAS values 461 and the predicted budget value 462 in a manner that accounts for recent sales trends and/or seasonal sales trends.

In certain embodiments, each weight 424 may reflect a value on a scale from 0 to 1 and value of the weight 424 can indicates how heavily a group of training features 420 (e.g., week_num, adspend, revenue, and weight) for a particular time period 423 should be used to influence the training of the machine learning model 350. For example, if a group a training features 420 is assigned a weight 424 with the value of 0 (or other lower value such as 0.1 or 0.2), the training features 420 will be relied upon less heavily in training the machine learning model 350. Conversely, a group of training features 420 that is assigned a value of 1 (or other high value such as 0.8 or 0.9) will be relied upon more heavily to influence the training of the machine learning model 350.

The manner in which the weights 424 are determined may vary. In certain embodiments, the weights 424 can be determined through experimentation in which different values of weights 424 are selected and evaluated, and the weights 424 with the best performance are selected. For example, in a scenario in which the training features span a timeframe of 70 weeks (or other applicable time periods 423), each week can be assigned an identifier (e.g., week1, week2, . . . , week70, such that week1 is the most recent week and week70 is the earliest week). The weights for the most recent weeks (e.g., week1, week2, week3, and week4) may be set to 0.9, the weights 424 for the same period in the previous year (e.g., week50, week51, week52, and week53) may be set to 0.8, and the remaining weeks may be assigned weights 424 of 0.2. This assignment of weights 424 results in this manner permits the training features 420 for recent time periods 423 and seasonal time periods (e.g., same weeks in the previous year) to have higher weight values compared to other weeks and, consequently, to have more importance when training the machine learning model 350.

Other types of scales and weighting techniques also may be utilized to represent the weights 424. For example, in certain embodiments, the training procedure 440 may determine and assign a weight 424 to each time period 423 based on automated analysis of historical campaign data 380 corresponding to items 360 that are same or similar to the item 360 which is the subject of the campaign prediction request. For example, the training procedure 440 may utilize the ad spend data 421 and revenue data 422 for the same or similar items 360 to identify sales trends for particular time periods 423.

In certain embodiments, the training features 420 utilized to train the machine learning model 350 may comprise a plurality of quadruplet data sets 425, each of which comprises: (1) a time period 423 (e.g., an identifier corresponding to a particular week or other timeframe); (2) ad spend data 421 associated with the timeframe 423; (3) revenue data 422 associated with the time period 423; and (4) a weight 424 associated with the time period 423. The quadruplet data sets 425 may then be input and processed by the machine learning model 350. The machine learning model 350 utilizes these training features to learn how to forecast predicted ROAS values 461 and predicted budget values 462 for the particular item 360 or items 360 which are the subject of the user's 305 forecast request.

The configuration of the machine learning model 350 can vary. In certain embodiments, the machine learning model 350 comprises a log linear regression model 450. In certain embodiments, in response to receiving a forecast request that indicates a desired budget, the log linear regression model 450 can utilize Equation 1 (below) to forecast predicted ROAS values 461:

$$\text{logpredicted\_revenue} = \alpha * \text{logbudget} + b \quad (1)$$

wherein:

predicted_revenue=the predicted revenue that will be generated for the campaign;

budget=the desired budget specified by the user for the campaign;

α=a slope value learned during training; and b=an intercept value learned during training.

In this scenario, the predicted ROAS value 461 can be determined by dividing the predicted_revenue by the adspend.

In certain embodiments, in response to receiving a forecast request that indicates a desired ROAS, the log linear regression model 450 can utilize Equations 2 and 3 (below) to forecast predicted budget values 462:

$$\text{ROAS} = \text{revenue}/\text{predicted\_budget} \quad (2)$$

$$\text{logrevenue} = \alpha * \text{log predicted\_budget} + b \quad (3)$$

wherein:

ROAS=the desired return on advertising spend specified by the user;

predicted budget=the predicted budget for the campaign;

revenue=the revenue that will be generated for the campaign;

α=a slope value learned during training; and b=an intercept value learned during training.

The predicted budget values 462 may be determined by solving the two equations provided above.

While certain embodiments described in this disclosure may be described as utilizing a log linear regression model 450 to generate the campaign predictions 460, it should be recognized that any appropriate learning model may alternatively, or additionally, be used to generate the campaign predictions 355.

Figure 5:
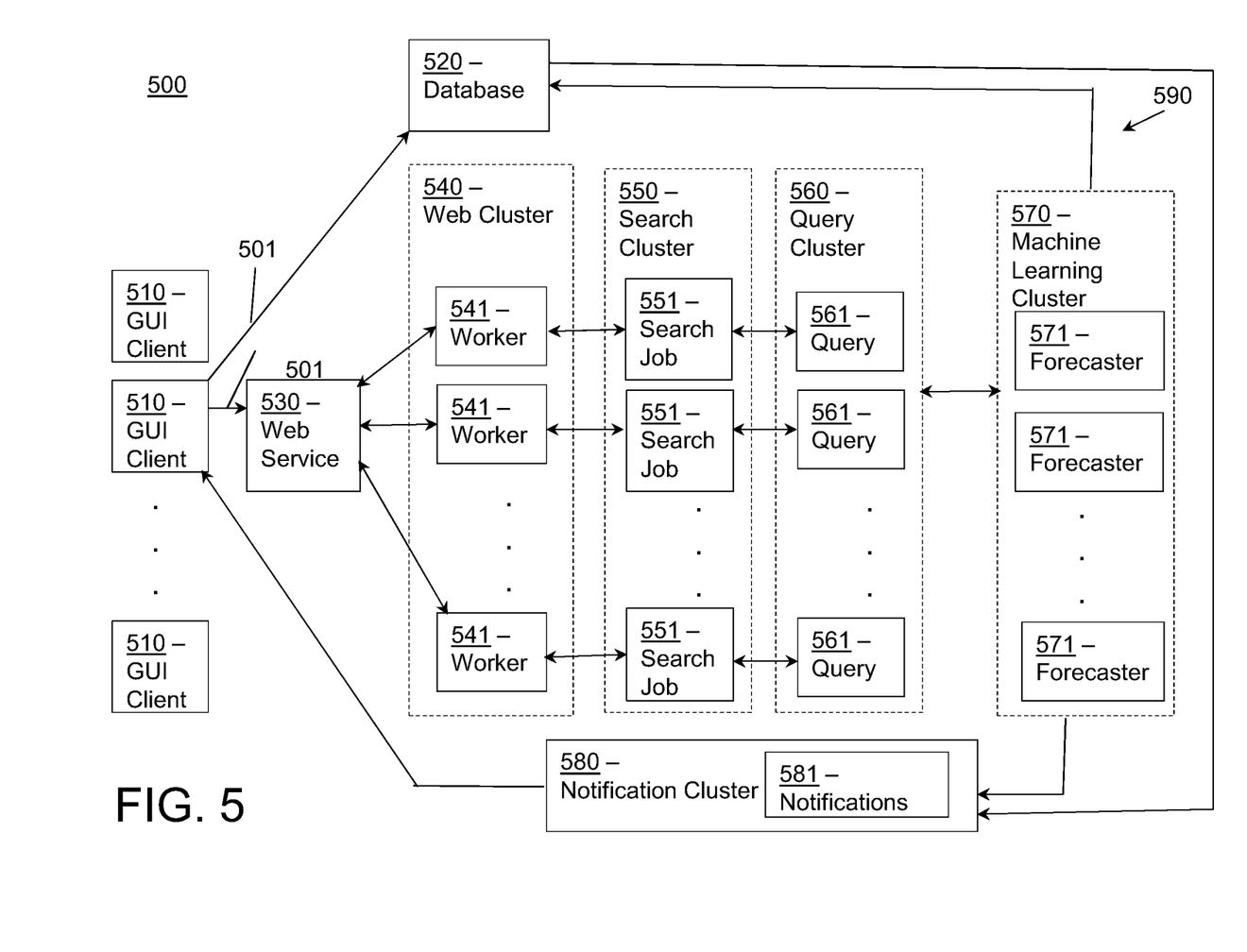
FIG. 5 illustrates a representative block diagram of an exemplary distributed processing system according to certain embodiments.

FIG. 5 illustrates a representative block diagram of an exemplary system 500 for implementing a portion of the system of FIG. 3 according to certain embodiments. Because training and executing the machine learning model 350 (FIGS. 3-4) can be computationally expensive, the exemplary system 500 is scalable to handle large numbers of forecast requests and is able to process the forecast requests quickly and efficiently using a distributed architecture.

The system 500 comprises one or more GUI clients 510, one or more databases 520, one or more web services 530, one or more web clusters 540, one or more search clusters 550, one or more query clusters 560, one or more machine learning clusters 570, and one or more notification clusters 580.

The GUI clients 510 may include GUIs 345 (FIG. 3) that are displayed to users 305 (FIG. 3), such as vendors, on user computers 340 (FIG. 3). The GUI clients 510 can enable communications between the vendors and the forecasting system 310 (FIGS. 3-4). In certain embodiments, the GUI clients 510 can be provided as a back-end system or portal that is available through the electronic platform 330 (FIGS. 3-4), which enables vendors to add, edit, delete, manage, and/or control electronic advertising campaigns 370 (FIGS. 3-4).

The GUI clients 510 may enable vendors or other users 305 (FIG. 3) to submit forecast requests 501 over a network 315 (FIG. 3). The forecast requests 501 may include requests to generate predicted ROAS values 461 (FIG. 4) and/or predicted budget values 462 (FIG. 4) as explained above. The forecast requests 501 may include information identifying desired budgets and/or desired ROASs specified by the users 305.

The forecast requests 501 may be received at a web service 530. The web service 530 may represent a web server, such as web server 320 (FIGS. 3-4), that is included in an electronic platform 330 (FIGS. 3-4) that provides a forecasting system 310 (FIGS. 3-4). In certain embodiments, the web service 530 may be implemented using Airflow web service and/or a similar web server provider.

The forecast requests 501 may be forwarded to a database 520 that stores information associated with the forecast requests 501. For example, for each forecast request 501, the database 520 can store any or all of the following information: data identifying an actual or potential electronic advertising campaign 370 associated with the forecast request 501 (FIGS. 3-4); data identifying the item 360 (FIGS. 3-4) or items 360 (FIGS. 3-4) related to the electronic advertising campaign 370 (FIGS. 3-4); data identifying the vendor associated with the electronic advertising campaign 370 (FIGS. 3-4); and data identifying the type of forecast request 501 being submitted (e.g., a request for a predicted ROAS value 461 and/or predicted budget value 462). The database 520 also may store information indicating the status of the forecast request (e.g., "pending/processing" or "completed"). The database 520 may also store any campaign predictions 355 (FIGS. 3-4) after the predictions have been generated. The database 520 may store other information as well.

The forecast requests 501 transmitted by the GUI client 510 also may be forwarded to a distributed processing system 590, which processes the requests. The distributed processing system 590 may include the one or more web clusters 540, the one or more search clusters 550, the one or more query clusters 560, the one or more machine learning clusters 570, and the one or more notification clusters 580.

Each web cluster 540 can include a plurality of workers 541 associated with the web service 530. The web cluster 540 and associated workers 541 can represent a distributed processing system for handling and managing multiple web requests, including the forecast requests 501, in a distributed manner. In certain embodiments, the web cluster 540 can represent a cluster of Airflow workers.

Each search cluster 550 can represent a distributed processing system that executes a plurality of search jobs 551 on the historical campaign data 380 (FIGS. 3-4). The search jobs 551, which may be executed in a distributed manner, can be configured to identify and fetch relevant historical campaign data 380 (FIGS. 3-4) that is associated with the item 360 or items 360 associated with the forecast requests 501. In certain embodiments, the search cluster 550 may represent an Elastic search cluster.

Each query cluster 560 can represent a distributed processing system that is configured to execute queries 561 on the historical campaign data 380 (FIGS. 3-4) retrieved by the search cluster 550. The queries 561, which may be executed in a distributed manner, can selectively retrieve or extract at least a portion of the training features 420 (FIG. 4) that are utilized to train the machine learning model 350 (FIGS. 3-4). For example, in certain embodiments, the queries 561 executed by the query cluster 560 can be utilized to retrieve the ad spend data 421 (FIG. 4), revenue data 422 (FIG. 4), and time periods 423 associated with previous electronic advertising campaigns 370 (FIGS. 3-4). In certain embodiments, the query cluster 560 also may be utilized to compute or otherwise obtain the weights 424 (FIG. 4) described above. In certain embodiments, the query cluster 560 can aggregate this information (e.g., into a plurality of quadruplet datasets as explained above) and provide this information for train the machine learning model 350 (FIGS. 3-4). In certain embodiments, the search cluster 550 may be implemented using Hive and/or Spark.

Each machine learning cluster 570 can represent a distributed processing system that is configured to generate campaign predictions 355 (FIGS. 3-4). A machine learning cluster 570 may include a plurality of forecasters 571, each of which may represent an separate instance of the machine learning model 350 (FIGS. 3-4) that is trained to compute a predicted ROAS value 461 (FIG. 4) and/or a predicted budget value 462 (FIG. 4) pertaining to a forecast request 501. The forecasters 571 can be trained utilizing the data aggregated by the query cluster 560 to make these predictions.

The notification cluster 580 can represent a distributed processing system that is configured to transmit notifications 581 to users 305 (FIG. 3) associated with the campaign predictions 355 (FIGS. 3-4) generated by the machine learning cluster 570. The notifications 581 can be transmitted in in a variety of different ways. In certain embodiments, the notifications 581 may include e-mails which identify the campaign predictions 355 (FIGS. 3-4) and/or which include a hyperlink to a webpage that includes the campaign predictions 355 (FIGS. 3-4). In certain embodiments, the notifications 581 may represent data that is displayed directly on the interfaces or GUI clients 510 that initiated the forecast requests 501. The notifications 581 may be provided in other forms as well.

Figure 6:
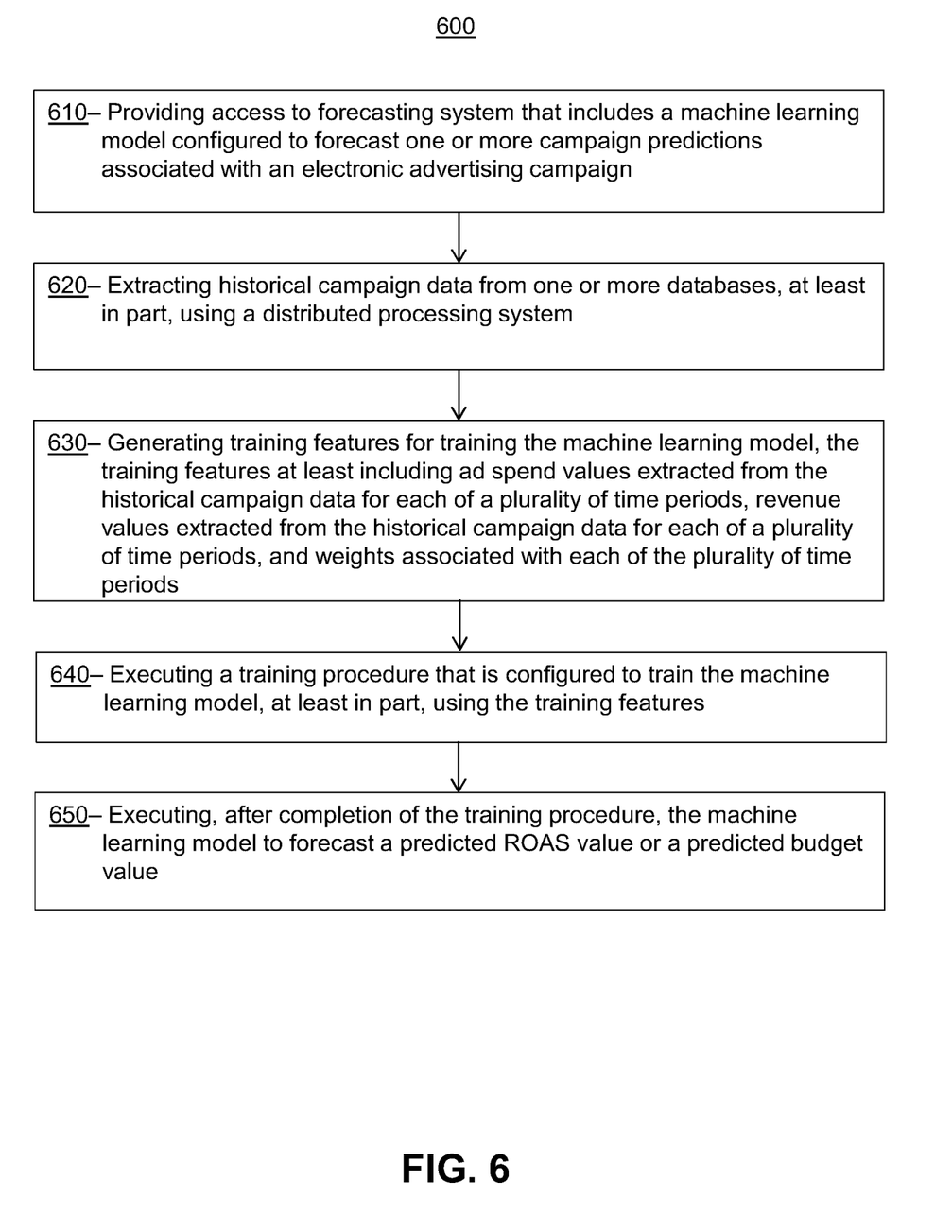
FIG. 6 illustrates a flowchart for a method according to certain embodiments.

FIG. 6 illustrates a flow chart for an exemplary method 600, according to certain embodiments. Method 600 is merely exemplary and is not limited to the embodiments presented herein. Method 600 can be employed in many different embodiments or examples not specifically depicted or described herein. In some embodiments, the activities of method 600 can be performed in the order presented. In other embodiments, the activities of method 600 can be performed in any suitable order. In still other embodiments, one or more of the activities of method 600 can be combined or skipped. In many embodiments, system 300 (FIGS. 3-4), system 500 (FIG. 5), and/or forecasting system 310 (FIGS. 3-4) can be suitable to perform method 600 and/or one or more of the activities of method 600. In these or other embodiments, one or more of the activities of method 600 can be implemented as one or more computer instructions configured to run at one or more processing modules and configured to be stored at one or more non-transitory memory storage modules. Such non-transitory memory storage modules can be part of a computer system such as system 300 (FIG. 3), forecasting system 310 (FIG. 3), and/or electronic platform 330 (FIG. 3). The processing module(s) can be similar or identical to the processing module(s) described above with respect to computer system 100 (FIG. 1).

In many embodiments, method 600 can comprise an activity 610 of providing access to a forecasting system 310 (FIGS. 3-4) that includes a machine learning model 350 (FIGS. 3-4) configured to forecast one or more campaign predictions 355 (FIGS. 3-4) associated with an electronic advertising campaign 370 (FIGS. 3-4). In certain embodiments, the one or more campaign predictions can include a predicted ROAS value 461 (FIG. 4) or a predicted budget value 462 (FIG. 4).

Method 600 can further comprise an activity 620 of extracting historical campaign data 380 (FIGS. 3-4) from one or more databases, at least in part, using a distributed processing system 590 (FIG. 5).

Method 600 can further comprise an activity 630 of generating training features 420 (FIG. 4) for training the machine learning model 350 (FIGS. 3-4), the training features 420 (FIG. 4) at least including ad spend values extracted from the historical campaign data for each of a plurality of time periods, revenue values extracted from the historical campaign data 380 (FIGS. 3-4) for each of a plurality of time periods, and weights associated with each of the plurality of time periods.

Method 600 can further comprise an activity 640 of executing a training procedure 440 (FIG. 4) that is configured to train the machine learning model 350 (FIGS. 3-4), at least in part, using the training features 420 (FIG. 4).

Method 600 can further comprise an activity 650 of executing, after completion of the training procedure 440 (FIG. 4), the machine learning model 350 (FIGS. 3-4) to forecast a predicted ROAS value 461 (FIG. 4) or a predicted budget value 462 (FIG. 4). The user may choose to initiate an advertising campaign based on the input parameters if the forecasts are acceptable, or may revise the input parameters (e.g., an input budget or ROAS) and re-execute additional predictions until desired forecasts are achieved.

As evidenced by the disclosure herein, the techniques set forth in this disclosure are rooted in computer technologies that overcome existing problems in known prediction systems, specifically problems dealing with providing accurate predictions for electronic advertising campaigns. The techniques described in this disclosure provide a technical solution (e.g., one that utilizes various machine learning techniques) for overcoming the limitations associated with known techniques. For example, the prediction techniques described herein take advantage of novel machine learning techniques to learn functions for generating, inter alia, ROAS and budget predictions which account for recent and/or seasonal trends. This technology-based solution marks an improvement over existing capabilities and functionalities related to computer systems by improving the accuracy and quality of the predictions. Moreover, in certain embodiments, this technology-based solution can include a distributed processing architecture that is highly scalable and which is capable of executing these predictions quickly and efficiently despite the large processing power which may be necessary to do so and despite the large number of requests that may be received.

In certain embodiments, the techniques described herein can advantageously improve user experiences with electronic platforms by quickly generating predictions with high accuracy before resources are dedicated to an electronic advertising campaign. In various embodiments, the techniques described herein can be executed dynamically in real time as a user accesses interfaces provided by an electronic platform. In many embodiments, the techniques described herein can be used continuously at a scale that cannot be reasonably performed using manual techniques or the human mind (e.g., due to the large number of requests and queries that are processed by the electronic platform). Furthermore, the data analyzed by the machine learning techniques described herein can be too large to be analyzed using manual techniques.

Furthermore, in a number of embodiments, the techniques described herein can solve a technical problem that arises only within the realm of computer networks, because machine learning does not exist outside the realm of computer networks.

Although systems and methods for forecasting campaign predictions have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-6 may be modified, and that the foregoing discussion of certain of these embodiments does not necessarily represent a complete description of all possible embodiments. For example, one or more of the procedures, processes, or activities of FIG. 6 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform functions comprising:
generating one or more training features for training a machine learning model, wherein each training feature of the one or more training features is segmented in a respective group of one or more groups by a respective time period of a plurality of time periods;
executing, after training the machine learning model, the machine learning model to generate a forecast by predicting at least a predicted return on an ad spend (ROAS) value; and
providing access to a forecasting system to predict one or more input parameters for an electronic advertising campaign to forecast one or more campaign predictions associated with the electronic advertising campaign.

2. The system of claim 1, wherein:
executing the machine learning model to generate the forecast further comprises:
predicting the one or more input parameters for the electronic advertising campaign, wherein the one or more campaign predictions comprise the predicted ROAS value or a predicted budget value; and
the computing instructions when executed on the one or more processors, further cause the one or more processors to perform additional functions comprising:
in response to providing access to the forecasting system, extracting historical campaign data from one or more databases, at least in part, using a distributed processing system;
generating the one or more training features for training the machine learning model, wherein the one or more training features comprise (i) ad spend values extracted from the historical campaign data for each respective time period of the plurality of time periods, (ii) revenue values extracted from the historical campaign data for each respective time period of the plurality of time periods, and (iii) weights associated with each respective time period of the plurality of time periods; and
executing a training procedure that is configured to train the machine learning model, at least in part, using the one or more training features.

3. The system of claim 2, wherein the weights associated with each respective time period of the plurality of time periods are utilized, at least in part, to train the machine learning model to account for recent sales trends or seasonal sales trends in each respective time period in generating the predicted ROAS value or the predicted budget value.

4. The system of claim 2, wherein:
the one or more training features are further segmented into a plurality of quadruplet datasets, each respective quadruplet dataset of the plurality of quadruplet datasets comprising a respective ad spend value of the ad spend values, a respective revenue value of the revenue values, a respective time period of the plurality of time periods associated with the respective ad spend value and the respective revenue value, and a respective weight of the weights segmented by each respective time period of the plurality of time periods;
the respective weight of the weights assigned to the respective quadruplet dataset is a respective value on a scale between 0 to 1, based on each respective time period; and
the respective value of the respective weight indicates how heavily the respective quadruplet dataset impacts the training of the machine learning model based on each respective time period.

5. The system of claim 1, wherein:
the forecasting system generates a graphical user interface that permits a user to enter inputs corresponding to a desired budget and a desired ROAS;
in response to receiving a first input corresponding to the desired budget, the machine learning model generates the predicted ROAS value; and
in response to receiving a second input corresponding to the desired ROAS, the machine learning model generates a predicted budget value.

6. The system of claim 1, wherein the machine learning model comprises a log linear regression model to predict the predicted ROAS value or a predicted budget value.

7. The system of claim 1, wherein the computing instructions when executed on the one or more processors, further cause the one or more processors to perform an additional function comprising:
in response to receiving a forecast request to generate the predicted ROAS value or a predicted budget value, processing the forecast request using a distributed processing system to generate the one or more training features for training the machine learning model specifically for one or more items associated with the electronic advertising campaign.

8. The system of claim 7, wherein the distributed processing system comprises:
a distributed web service cluster configured to process forecast requests received at a web server in a distributed manner;
a distributed search cluster configured to aggregate historical campaign data pertaining to the forecast requests in a distributed manner;
a distributed query cluster configured to execute queries on the historical campaign data in a distributed manner to derive the one or more training features for training the machine learning model; and
a distributed machine learning cluster configured to forecast the predicted ROAS value or the predicted budget value pertaining to the forecast requests.

9. The system of claim 8, wherein the distributed processing system comprises a distributed notification cluster that is configured to transmit notifications to enable the predicted ROAS value or the predicted budget value to be accessed.

10. The system of claim 1, wherein:
the forecasting system creates the electronic advertising campaign for one or more search engines;

the forecasting system is integrated with an electronic commerce platform that offers one or more items;

the electronic advertising campaign is associated with advertising the one or more items on one or more electronic search engines; and the forecasting system enables users to generate the predicted ROAS value or a predicted budget value prior to initiating the electronic advertising campaign.

11. A method being implemented via execution of computing instructions configured to run at one or more processors and stored at one or more non-transitory computer-readable media, the method comprising:

generating one or more training features for training a machine learning model, wherein each training feature of the one or more training features is segmented in a respective group of one or more groups by a respective time period of a plurality of time periods;

executing, after training the machine learning model, the machine learning model to generate a forecast by predicting at least a predicted return on an ad spend (ROAS) value; and providing access to a forecasting system to predict one or more input parameters for an electronic advertising campaign to forecast one or more campaign predictions associated with the electronic advertising campaign.

12. The method of claim 11, wherein:

executing the machine learning model to generate the forecast further comprises:

predicting the one or more input parameters for the electronic advertising campaign, wherein the one or more campaign predictions comprise the predicted ROAS value or a predicted budget value; and further comprising:

in response to providing access to the forecasting system, extracting historical campaign data from one or more databases, at least in part, using a distributed processing system;

generating the one or more training features for training the machine learning model, wherein the one or more training features comprise (i) ad spend values extracted from the historical campaign data for each respective time period of the plurality of time periods, (ii) revenue values extracted from the historical campaign data for each respective time period of the plurality of time periods, and (iii) weights associated with each respective time period of the plurality of time periods; and executing a training procedure that is configured to train the machine learning model, at least in part, using the one or more training features.

13. The method of claim 12, wherein the weights associated with each respective time period of the plurality of time periods are utilized, at least in part, to train the machine learning model to account for recent sales trends or seasonal sales trends in each respective time period in generating the predicted ROAS value or the predicted budget value.

14. The method of claim 12, wherein:

the one or more training features are further segmented into a plurality of quadruplet datasets, each respective quadruplet dataset of the plurality of quadruplet datasets comprising a respective ad spend value of the ad spend values, a respective revenue value of the revenue values, a respective time period of the plurality of time periods associated with the respective ad spend value and the respective revenue value, and a respective weight of the weights segmented by each respective time period of the plurality of time periods;

the respective weight of the weights assigned to the respective quadruplet dataset is a respective value on a scale between 0 to 1, based on each respective time period; and the respective value of the respective weight indicates how heavily the respective quadruplet dataset impacts the training of the machine learning model based on each respective time period.

15. The method of claim 11, wherein:

the forecasting system generates a graphical user interface that permits a user to enter inputs corresponding to a desired budget and a desired ROAS;

in response to receiving a first input corresponding to the desired budget, the machine learning model generates the predicted ROAS value; and in response to receiving a second input corresponding to the desired ROAS, the machine learning model generates a predicted budget value.

16. The method of claim 11, wherein the machine learning model comprises a log linear regression model to predict the predicted ROAS value or a predicted budget value.

17. The method of claim 11, further comprising:

in response to receiving a forecast request to generate the predicted ROAS value or a predicted budget value, processing the forecast request using a distributed processing system to generate the one or more training features for training the machine learning model specifically for one or more items associated with the electronic advertising campaign.

18. The method of claim 17, wherein the distributed processing system comprises:

a distributed web service cluster configured to process forecast requests received at a web server in a distributed manner;

a distributed search cluster configured to aggregate historical campaign data pertaining to the forecast requests in a distributed manner;

a distributed query cluster configured to execute queries on the historical campaign data in a distributed manner to derive the one or more training features for training the machine learning model; and a distributed machine learning cluster configured to forecast the predicted ROAS value or the predicted budget value pertaining to the forecast requests.

19. The method of claim 18, wherein the distributed processing system comprises a distributed notification cluster that is configured to transmit notifications to enable the predicted ROAS value or the predicted budget value to be accessed.

20. The method of claim 11, wherein:

the forecasting system creates the electronic advertising campaign for one or more search engines;

the forecasting system is integrated with an electronic commerce platform that offers one or more items;

the electronic advertising campaign is associated with advertising the one or more items on one or more electronic search engines; and the forecasting system enables users to generate the predicted ROAS value or a predicted budget value prior to initiating the electronic advertising campaign.

\* \* \* \* \*